United States Patent
Lin

(10) Patent No.: US 8,256,372 B2
(45) Date of Patent: Sep. 4, 2012

(54) APPARATUS FOR APPLYING DEGLOSSING PAINT ON PERIPHERAL INACTIVE PORTION INCLUDING A SLIDABLE HOLDER AND ELASTICALLY DISPOSED CARRIER

(75) Inventor: Tsung-Yu Lin, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 570 days.

(21) Appl. No.: 12/502,368

(22) Filed: Jul. 14, 2009

(65) Prior Publication Data

US 2010/0031880 A1    Feb. 11, 2010

(51) Int. Cl.
  *B05C 11/00* (2006.01)
  *B05C 13/00* (2006.01)
  *B05D 5/06* (2006.01)
(52) U.S. Cl. ........ 118/270; 118/264; 118/500; 427/162; 427/164
(58) Field of Classification Search .............. 118/49, 118/50, 697; 427/162, 164; 204/298
  See application file for complete search history.

(56) References Cited

U.S. PATENT DOCUMENTS

| | | | | |
|---|---|---|---|---|
| 2,982,061 A * | 5/1961 | Dillon | | 451/460 |
| 3,277,612 A * | 10/1966 | Brandt | | 451/460 |
| 4,267,208 A * | 5/1981 | Ireland | | 427/154 |
| 5,026,469 A * | 6/1991 | Kunkel et al. | | 204/298.15 |
| 6,296,707 B1 * | 10/2001 | Adamczyk et al. | | 118/668 |
| 2003/0152693 A1 * | 8/2003 | Su et al. | | 427/162 |
| 2006/0012002 A1 * | 1/2006 | Brechignac et al. | | 257/432 |
| 2008/0156262 A1 * | 7/2008 | Igarashi et al. | | 118/642 |

FOREIGN PATENT DOCUMENTS

| | | |
|---|---|---|
| CN | 2693353 | 4/2005 |
| CN | 2810098 | 8/2006 |
| EP | 1854549 | 11/2007 |

* cited by examiner

*Primary Examiner* — Dah-Wei Yuan
*Assistant Examiner* — Karl Kurple
(74) *Attorney, Agent, or Firm* — Altis Law Group, Inc.

(57) ABSTRACT

An exemplary apparatus for applying deglossing paint on a peripheral inactive portion of a lens is provided. The apparatus includes a platform, a holder and a printing device. The platform includes a worktable, and a supporting member extending from the worktable and having a cantilever portion suspending above the worktable. The holder is mounted on the worktable, and is configured for holding one or more lenses thereon. The printing device is supported by the cantilever portion, and includes a stamper facing toward the lens. The stamper is capable of having the deglossing paint stained thereon and applying the deglossing paint on the peripheral inactive portion by bringing the deglossing paint into contact with the peripheral inactive portion.

5 Claims, 4 Drawing Sheets

1

APPARATUS FOR APPLYING DEGLOSSING PAINT ON PERIPHERAL INACTIVE PORTION INCLUDING A SLIDABLE HOLDER AND ELASTICALLY DISPOSED CARRIER

BACKGROUND

1. Technical Field

The present disclosure relates to an apparatus for applying deglossing paint on peripheral inactive portion of lens.

2. Description of Related Art

Lenses are widely used in image capture apparatuses. The lenses are made with transparent bodies. Usually, the transparent body includes a central active portion and a peripheral inactive portion. The central active portion is in optical shape, and configured for capturing light from objects. The peripheral inactive portion is configured for supporting the central active portion, and could be adhered to or fixed with a lens holder. In function, the peripheral inactive portion does not need to be transparent. Furthermore, according to researches and practices of image capturing, a transparent peripheral inactive portion would cause ghost effect on the captured images.

Deglossing paint has been proposed to be applied on the peripheral inactive portion so as to keep the ghost effect at a minimum. However, when the lens is small in size, to apply the deglossing paint on the peripheral inactive portion by hand is very difficult, and the efficiency is low.

What is needed, therefore, is an apparatus for applying deglossing paint on a peripheral inactive portion of lens, which can overcome the above shortcomings.

BRIEF DESCRIPTION OF THE DRAWINGS

Many aspects of the apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE EMBODIMENTS

Embodiments of the present apparatus will now be described in detail below and with reference to the drawings.

Figure 1:
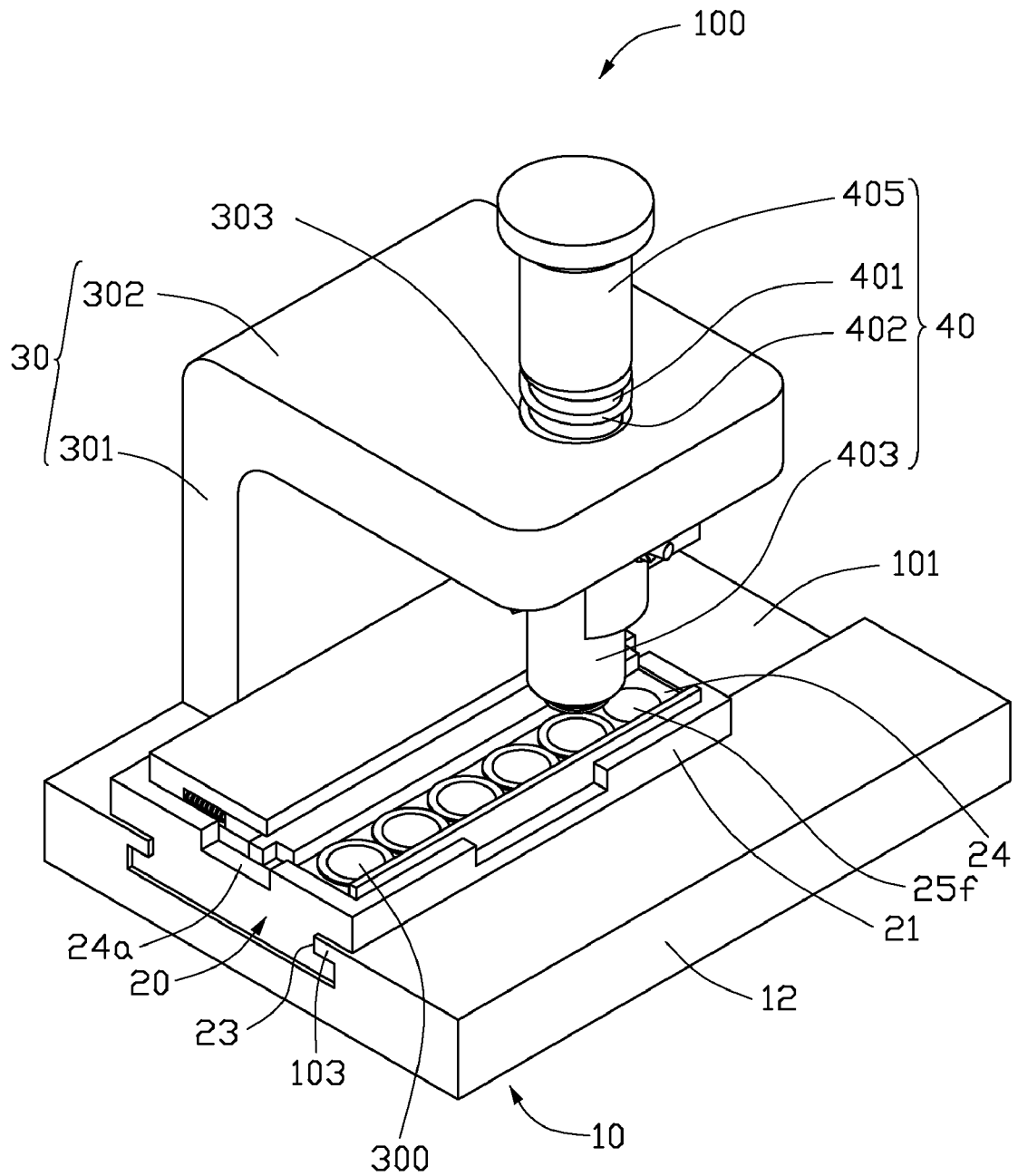
FIG. 1 is a schematic view of an apparatus for applying deglossing paint on a peripheral inactive portion of lens, in accordance with an embodiment.
Figure 2:
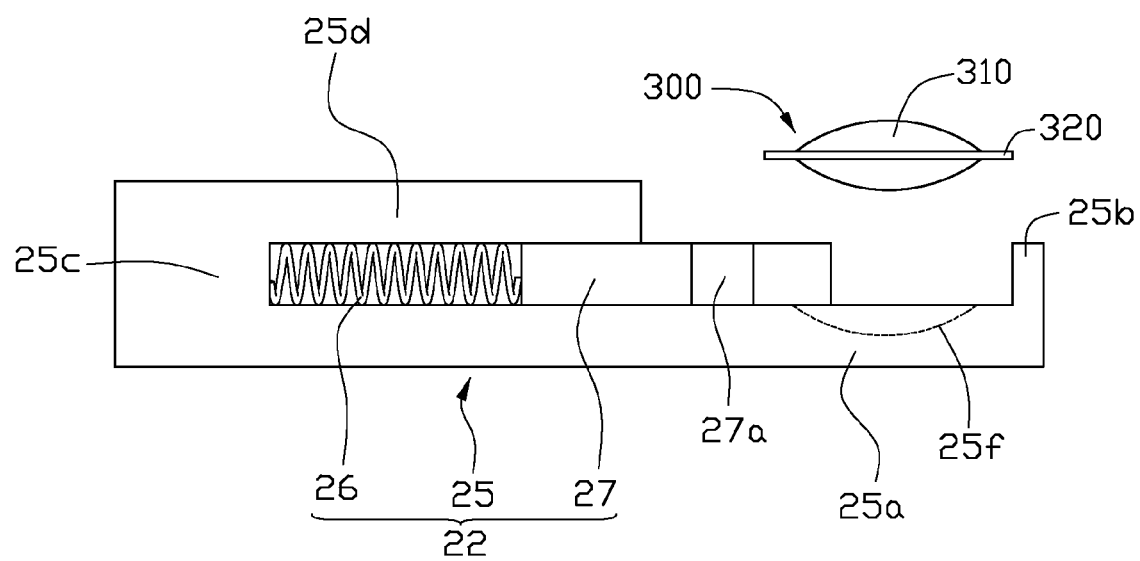
FIG. 2 is a schematic view of a lens and a carrier used in the apparatus of FIG. 1.
Figure 3:
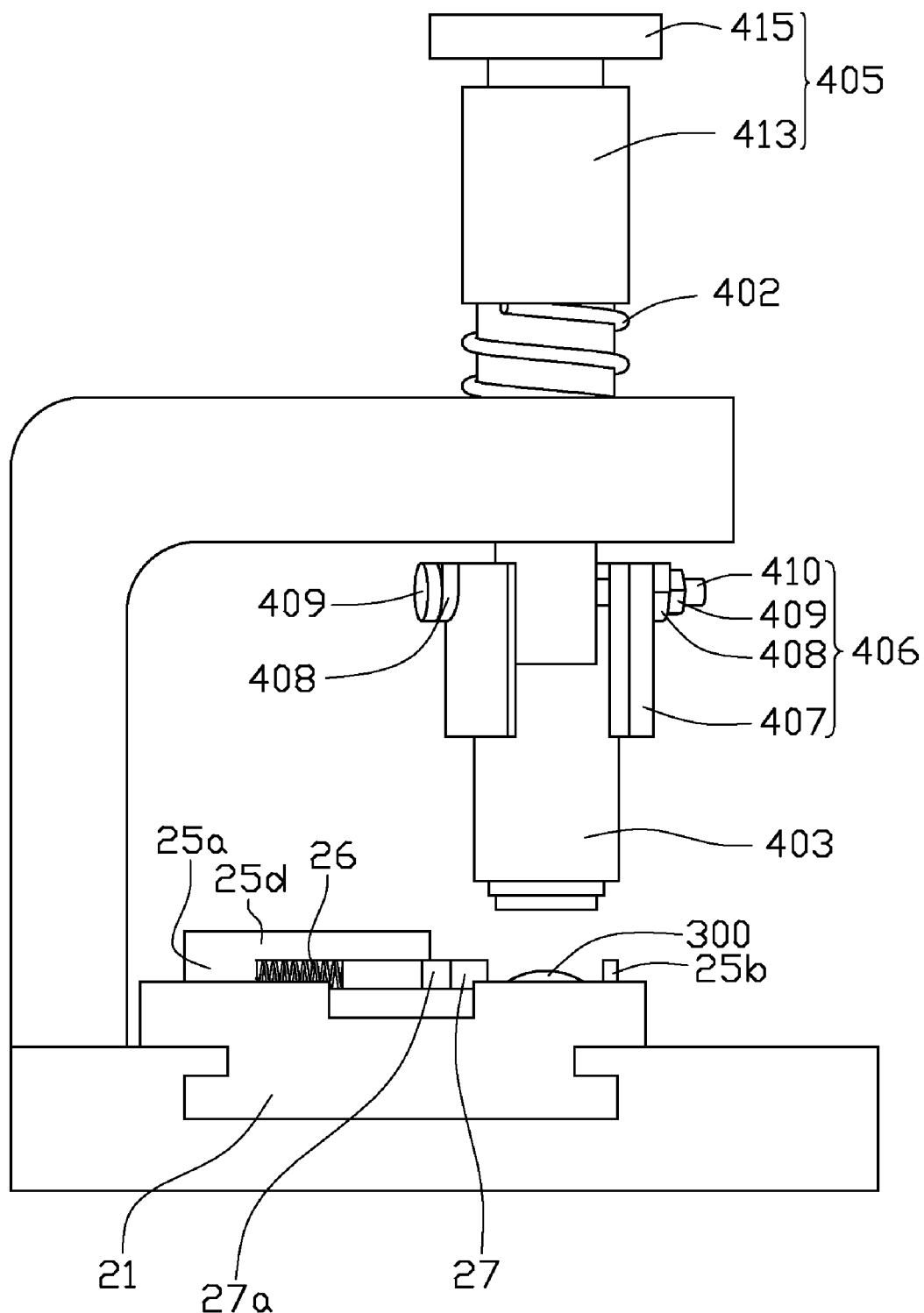
FIG. 3 is a left side elevational view of the apparatus of FIG. 1.
Figure 4:
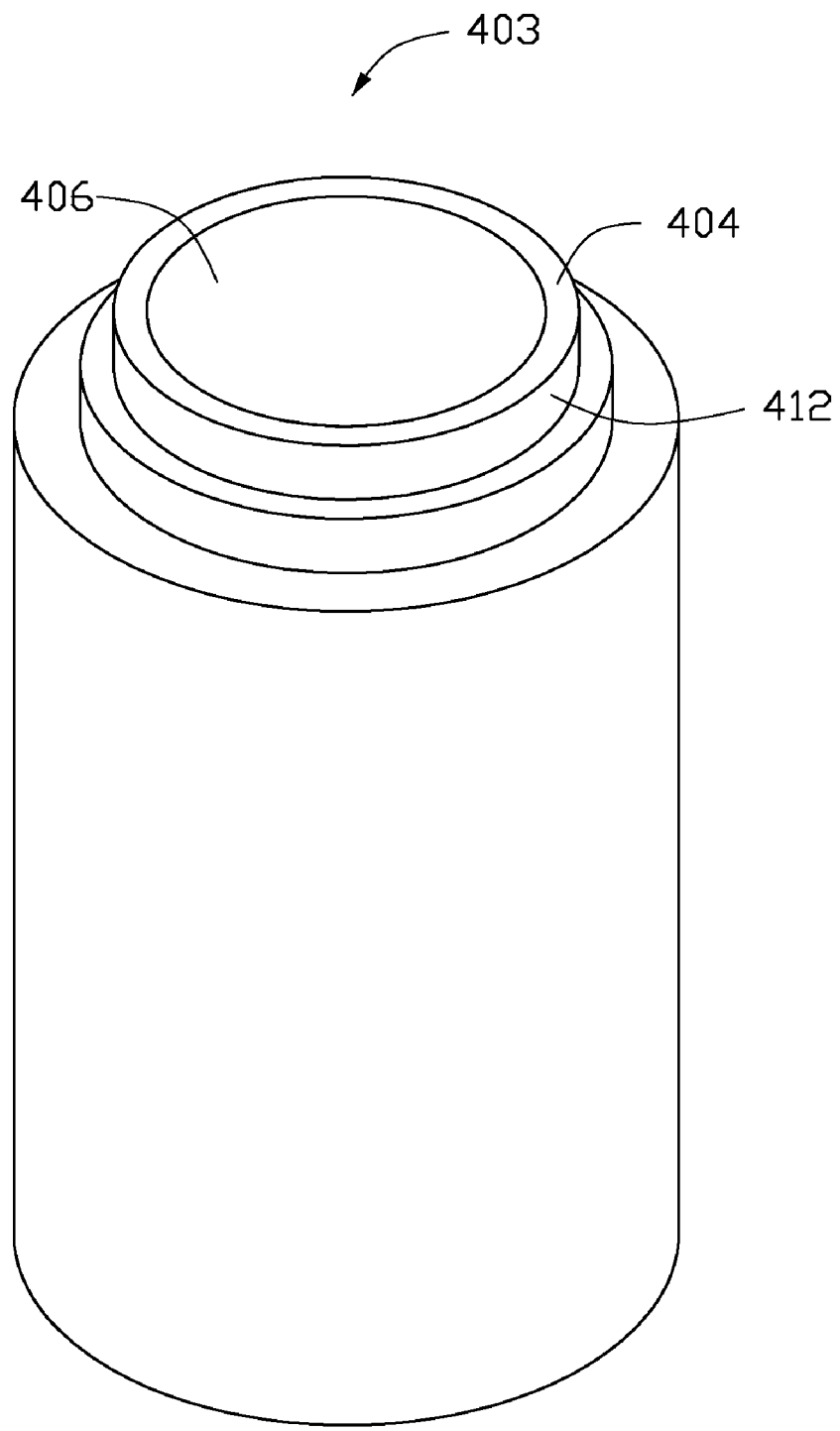
FIG. 4 is a schematic view of the stamper shown in FIG. 1.

Referring to FIGS. 1 to 4, an exemplary apparatus 100 includes a platform 10, a holder 20 for holding a plurality of lenses 300, and an printing device 40 for applying a deglossing paint (not shown) on peripheral inactive portions 320 of the lenses 300. In the present embodiment, each of the lenses 300 (see FIG. 2) are two-convex lenses, i.e., a central active portion 310 is composed of two convex optical surfaces, the peripheral inactive portion 320 surrounds the central active portion 310.

The platform 10 includes a worktable 12 and a supporting member 30. The worktable 12 has a groove 101 formed in a top surface thereof, with two projections 103 formed on opposite inner surfaces of the groove 101. Top surface of each of the projections 103 is coplanar with the top surface of the worktable 12. The supporting member 30 extends from the worktable 12. The supporting member 30 includes a vertical portion 301 which is perpendicular to the worktable 12, and a cantilever portion 302 which suspends above the worktable 12 and is parallel to the worktable 12. The cantilever portion 302 has a through hole 303 defined therein.

The holder 20 includes a base 21 and a carrier 22. The base 21 is substantially rectangular shaped, and mainly includes a bottom portion and an upper portion. Between the bottom portion and the upper portion, two recesses 23 are formed in opposite surfaces of the base 21, respectively. The upper portion has a rectangular cavity 24 formed in a top surface thereof, and four cutouts 24a formed in sidewalls of the cavity 24. The bottom portion is movably seated in the groove 101. The projections 103 are slidably engaged in the respective recesses 23, and thus the upper portion is seated on the projections 103.

The carrier 22 is disposed in the cavity 24. The carrier 22 (see FIG. 2) includes a seat 25, an elastic member 26, and a slide block 27. The seat 25 is substantially rectangular shaped, and is composed of a bottom plate 25a, two side plates 25b, 25c, and a cover 25d extending from the side plate 25c. The elastic member 26 and the slide block 27 are disposed on the bottom plate 25a. One end of the elastic member 26 is fixed to the side plate 25c, and the other end of the elastic member 26 is fixed to the slide block 27. The cover 25d covers the elastic member 26 and part of the slide block 27. The slide block 27 has two protrusions 27a extending from opposite two ends thereof in the lengthwise direction. The protrusions 27a can be pulled through the cutouts 24a of the base 21 to slide the slide block 27 towards the side plate 25b or towards the slide plate 25c. The lenses 300 are disposed on the bottom plate 25a, between the slide block 27 and the side plate 25b. In the present embodiment, a plurality of cavities 25f are formed in the bottom plate 25a for receiving the bottom convex optical surfaces therein, such that the lenses 300 can be steadily disposed on the bottom plate 25a. When the lenses 300 are disposed between the slide block 27 and the side plate 25b, the elastic member 26 applies a force (i.e., the elastic member is in compressed state) on the slide block 27, thus the slide block 27 and the side plate 25b cooperatively holds the lenses 300.

The printing device 40 includes a pole 401, an elastic member 402, a cap 405 and a stamper 403. The elastic member 402 wraps around the pole 401, and is fixed to an inner wall of the through hole 303. The pole 401 extends through the through hole 303 and is supported by the elastic member 402. The cap 405 is mounted to a top end of the pole 401. The cap 405 has a cylindrical portion 413 in contact with the elastic member 402, and a pressing portion 415 at an end thereof. The stamper 403 is removably mounted to a bottom end of the pole 401 by a fastening means 406 (see FIG. 3) including two arc clamping plates 407, two spacers 408, two nuts 409, and bolt 410. The clamping plates 407, spacers 408, nut 409, and bolt 410 are mounted to the bottom end of the pole 401, and the clamping plates 407 clamps the stamper 403.

The stamper 403 (see FIG. 4) is cylindrical, and has an end portion 412. The end portion 412 is made of a soft material, such as sponge which is easy to have the deglossing paint stained thereon and easy to squeeze out the deglossing paint. The deglossing paint could be additionally provided. The end portion 412 has a bottom end surface 404. An area of the bottom end surface 404 is equal to that of the peripheral inactive portion 320 of the lens 300. When applying a pressing force on the pressing portion 415 of cap 405, the bottom end surface 404 is able to contact the peripheral inactive portion 320 of one of the lenses 300 and thus apply the deglossing paint on the peripheral inactive portion 320. When the pressing force is removed, the stamper 403 snaply separates from the lenses 300 and return to its original position under the force provided by elastic member 402. To avoid the central active portion 310 of the lens 300 being stained, a central area 406 of the end portion 412 is hollow or is recessed.

When the apply of deglossing paint on one of the lenses 300 is finished, the stamper 403 can work on the next one of the lenses 300 by simply moving the base 21 relative to the worktable 12. When all of the lenses 300 on the carrier 22 are finished, the lenses 300 can be taken out by applying a pulling force on the slide block 27 towards the side plate 25c.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. An apparatus for applying deglossing paint on a lens, the lens comprising a central active portion and a peripheral inactive portion, the deglossing paint being applied on the peripheral inactive portion, the apparatus comprising:
   a platform comprising a worktable, and a supporting member extending from the worktable, the worktable having a groove formed in a surface thereof, with two projections formed on opposite inner surfaces of the groove, and the supporting member having a cantilever portion suspending above the worktable;
   a holder mounted on the worktable, and configured to hold at least one lens thereon, the holder comprising:
   a base having a bottom portion, an upper portion and two recesses formed between the bottom portion and the upper portion, the bottom portion movably seated in the groove, the projections slidably engaged in the respective recesses, the upper portion seated on the projections, and the upper portion having a cavity formed in a top surface thereof; and
   a carrier disposed in the cavity, the carrier comprising a seat, a first elastic member and a slide block, the seat comprising a bottom plate, a first side plate and an opposite second side plate, the first elastic member and the slide block being disposed on the bottom plate, one end of the first elastic member being fixed to the first side plate, another end of the first elastic member being fixed to the slide block, the at least one lens being disposed on the bottom plate between the slide block and the second side plate, and the first elastic member configured to apply a force on the slide block, such that the slide block and the second side plate cooperatively hold the at least one lens in position; and
   a printing device mounted on the cantilever portion, the printing device comprising a stamper facing toward the lens, the stamper having a deglossing paint thereon, the stamper configured for applying the deglossing paint on the peripheral inactive portion by bringing the deglossing paint into contact with the peripheral inactive portion.

2. The apparatus as described in claim 1, wherein the cantilever portion is parallel with the worktable.

3. The apparatus as described in claim 2, wherein the cantilever portion has a through hole defined therein, the printing device further comprises a pole and a second elastic member, the second elastic member wraps around the pole and is fixed to an inner wall of the through hole, the pole extends through the through hole and is supported by the second elastic member, and the stamper removably mounted to a bottom end of the pole.

4. The apparatus as described in claim 1, wherein the stamper is cylindrical and has a hollow end portion, the end portion has a bottom end surface, an area of the bottom end surface being equal in size to the area of the peripheral inactive portion.

5. The apparatus as described in claim 4, wherein the end portion is made of sponge.

* * * * *